(12) United States Patent
Qu (10) Patent No.: US 9,811,698 B2
(45) Date of Patent: Nov. 7, 2017

(54) SYSTEM AND METHOD FOR TRACKING AND UTILIZING DATA TAG CARRIERS

(71) Applicant: Lidong Qu, Beijing (CN)

(72) Inventor: Lidong Qu, Beijing (CN)

(73) Assignee: Lidong Qu, Beijing (CN)

( * ) Notice: Subject to any disclaimer, the term of this patent is extended or adjusted under 35 U.S.C. 154(b) by 0 days.

(21) Appl. No.: 14/383,824

(22) PCT Filed: Jul. 18, 2014

(86) PCT No.: PCT/CN2014/082549
§ 371 (c)(1),
(2) Date: Jun. 7, 2016

(87) PCT Pub. No.: WO2015/043294
PCT Pub. Date: Apr. 2, 2015

(65) Prior Publication Data
US 2016/0364588 A1     Dec. 15, 2016

(30) Foreign Application Priority Data

Sep. 30, 2013  (CN) .......................... 2013 1 0460760

(51) Int. Cl.
| | |
|---|---|
| *G06K 19/06* | (2006.01) |
| *G06K 7/10* | (2006.01) |
| *G06Q 10/06* | (2012.01) |
| *G06K 7/14* | (2006.01) |
| *G06Q 30/02* | (2012.01) |
| *G06Q 30/06* | (2012.01) |

(52) U.S. Cl.
CPC ....... *G06K 7/10366* (2013.01); *G06K 7/1417* (2013.01); *G06Q 10/06* (2013.01); *G06Q 30/0251* (2013.01); *G06Q 30/0631* (2013.01)

(58) Field of Classification Search
CPC ............. G06K 19/0637; G06K 7/1404; G06K 7/1413; G06K 7/1417
USPC .......................... 235/494, 454, 462.9, 462.1
See application file for complete search history.

(56) References Cited

U.S. PATENT DOCUMENTS

| | | | |
|---|---|---|---|
| 8,214,387 B2* | 7/2012 | King | .................. H04N 1/00244 235/375 |
| 8,699,088 B2* | 4/2014 | Cowburn | ................. G06K 7/14 235/375 |
| 8,915,450 B2* | 12/2014 | Simske | .................. G06F 21/36 235/494 |

(Continued)

*Primary Examiner* — Daniel St Cyr
(74) *Attorney, Agent, or Firm* — SV Patent Service (57) ABSTRACT

Systems and methods are disclosed for tracking and utilizing data tag carriers involving a plurality of terminals, and associated data tags and data tag carriers. A first terminal obtains an initial data tag from an initial data tag carrier. The initial data tag includes initial service processing information and information about the initial data tag carrier. A first data tag carrier group is coupled to the first terminal and comprising at least one first data tag carrier. The first data tag carrier group obtains the initial data tag from the first terminal and to release the first data tag through the first data tag carrier. The first data tag includes a first service processing information, information about the first terminal and the first data tag carrier. The disclosed systems and methods are simple, easy to implement, and of low cost.

23 Claims, 4 Drawing Sheets

(56) References Cited

U.S. PATENT DOCUMENTS 8,931,701 B2 * 1/2015 Lawandy ................. G06K 7/12
  235/462.01
8,998,093 B2 * 4/2015 Atkinson ................ G06F 21/10
  235/435

* cited by examiner

SYSTEM AND METHOD FOR TRACKING AND UTILIZING DATA TAG CARRIERS

BACKGROUND OF THE INVENTION

The present invention relates to the field of computer communication and related technology applications, in particular, to network-based data tagging technologies, and specifically to systems and methods suitable for processing information related to offline data tags.

Two-dimensional (2D) codes (also referred as two-dimensional barcodes, data matrix codes, or QR codes) have large information capacity, superior security, high rate of data retrieval, and strong error correction ability. After they were invented, 2D codes have been widely applied to logistics and operations management, and identification card management. With increased popularity of smart phones, 2D codes can be captured and uploaded onto real-time Internet by smart phones in real time and used cross-media channels, which enable them to find wide applications in Object-to-Object (OTO) fields, such as information acquisition, mobile shopping, commodity counterfeiting, identity authentication, coupon distribution, and so on. The OTO applications of 2D codes, however, currently focus primarily on ease of entry in e-commerce; it still lacks in-depth applications.

On the other hand, 2D codes such as bar codes have already been widely displayed in various offline carriers, such as on magazines or on exterior surfaces of buildings, etc., which enable viewers to acquire relevant information about goods or services. This approach allows users to use mobile phones and other intelligent terminal devices to obtain data tag from a wide variety of carriers, allowing more convenient executions of their corresponding functions. In contrast to data tags online, the users cannot easily conduct secondary transfer, that is, forward and share, offline data tags. In particular, users cannot use multiple offline data tags in a single application as they often do with online data tags. Moreover, users cannot record data transmission paths of the offline carriers, which significantly restricts the scope of data tagging and it associated services, and ultimately inhibits data tags to be used in large-scale commercial applications.

SUMMARY OF THE INVENTION

The purpose of the present invention is to overcome the drawbacks in the above-described prior art and to provide an effective information carrier for recording the transfer process for data tags. The disclosed system and method can support the transfer of offline data tags, thus expanding scope of data tag transfers and recording the overall transfer paths of the data tags. The disclosed system and methods are simple and easy to implement, and are suitable large-scale commercial applications, which enables application and processing of low-cost data tag carriers.

To achieve the above described objects, the present disclosure provides an application system for tracking and utilizing data tag carriers can include one or more of the following composition:

The system includes a first terminal and a first data tag carrier group, wherein the first terminal is configured to obtain initial data tag from an initial data tag carrier, wherein the initial data tag includes information for initial service processing and initial carrier information. The first data tag carrier group, coupled to the first terminal, includes at least one first data tag carrier for obtaining the initial data tag from the first terminal, and releasing a first data tag. The first data tag carrier includes information about first service processing and the first terminal, and can release information about the first data tag carrier of the first data tag.

The application system for tracking and utilizing data tag carriers also includes an Nth terminal and an Nth data tag carrier groups, wherein the Nth terminal can obtain an (N−1)th data tag from the (N−1) carrier, wherein the (N−1)th data tag includes information for (N−1)th service processing, and information about an (N−1)th terminal and the (N−1)th carrier. The Nth data tag carrier group, coupled to the Nth terminal, includes at least one Nth data tag carrier for obtaining the (N−1)th data tag from the Nth terminal, and releasing an Nth data tag. The Nth data tag carrier includes information about Nth service processing and the Nth terminal, and can release information about the Nth data tag carrier of the Nth data tag.

The disclosed application system for tracking and utilizing data tag carriers further includes a carrier resource manager that is connected to the first terminal and the Nth terminal. The carrier resource manager stores information about data tag carriers associated with from first terminal to the Nth terminal, and sends the information about the Nth terminal and the Nth data tag carrier to the first terminal and the Nth terminal.

In the disclosed application system for tracking and utilizing data tag carriers, the first tag can further include initial data tag carrier information; the Nth data tag can further include (N−1)th carrier information.

The disclosed application system for tracking and utilizing data tag carriers can further include a service processor connected to the first terminal and the Nth terminal. The service processor is configured to store the above described first service processing information, and the N-th service processing information, and information about the corresponding first terminal, the first data tag carrier, the Nth terminal, and the Nth data tag carrier.

In the disclosed application system for tracking and utilizing data tag carriers, the above described data tag can include barcodes and RFID tags.

In the disclosed application system for tracking and utilizing data tag carriers, the carrier can be a display device, prints, and the surface of a building or furniture.

In the disclosed application system for tracking and utilizing data tag carriers, the data tag can include electronic tags coded based on predetermined rules. The first data tag includes a first service processing information and information about the first terminal, and can release the first electronic tag in the first data tag. The Nth data tag includes an Nth service processing information and information about the Nth terminal, and can release the Nth electronic tag in the Nth data tag.

In the disclosed application system for tracking and utilizing data tag carriers, the first terminal and the Nth terminal tag respectively include a first and an Nth electronic tag modules respectively configured to obtain a first and an Nth electronic tag over a computer network.

The disclosed application system for tracking and utilizing data tag carriers can further include an electronic tag application server connected to the first terminal and the Nth terminal respectively. The electronic tag application server stores the first electronic tag and the N electronic tags, for supplying the first terminal with the first electronic tag and for supplying the Nth terminal with the Nth electronic tag.

The disclosed application system for data tag carriers can further include a network access apparatus that is connected to the first terminal and the Nth terminal. The network access apparatus stores the first and second electronic tags, and the corresponding first and the Nth data tags, which can be respectively supplied to the first terminal and the Nth terminal.

In the disclosed application system for data tag carriers, the electronic tag can be wireless network identification mark SSID.

In the disclosed application system for data tag carriers, the terminals can include personal computers, smart phones, tablet computers, or RFID tag scanners.

The present invention also provides an application method for tracking and utilizing data tag carriers, comprising the steps of:

(A1) According to the operation by a first user, the first terminal obtains an initial data tag from an initial data tag carrier, the initial data including a corresponding initial service processing information and initial carrier information;

(A2) The first terminal sends the initial data tag to the first data tag carrier group associated with the first terminal, the first data tag carrier group comprising at least one first data tag carrier;

(A3) Every carrier in the first data tag carrier group releases their respective first data tags, the first data tags including a first service processing information, information about the first terminal, and a release of the first data tag and the first data tag carrier information.

The application method for tracking and utilizing data tag carriers can further include one or more of the comprises the following steps:

(B1) According to the operation of the Nth user, the Nth terminal obtains the N−1 data tag from the first N−1 carrier;

(B2) The Nth terminal connects the (N−1)th data tag with the Nth data tag carrier, the Nth data tag carrier group of carriers comprising at least one N-th carrier;

(B3) Every Nth data tag in the Nth data tag carrier group N releases their respective Nth data tags, the Nth data tags including an Nth service processing information, information about the Nth terminal, and a release of the Nth data tag and the Nth data tag carrier information.

In the application method for tracking and utilizing data tag carriers, the first terminal and the Nth terminal are both connected to a carrier resource manager, wherein the carrier resource manager stores information about different carrier groups associated with different terminals. In step (A2), the first terminal obtains information about the first data tag carrier group from the carrier resource manager, and transmits the initial data tag to at least one first data tag carrier in the first data tag carrier group. In step (B2), the Nth terminal obtains information about the Nth data tag carrier group from the carrier resource manager, and transmits the (N−1)th data tag to at least one Nth data tag carrier in the Nth data tag carrier group.

In the application method for tracking and utilizing data tag carriers, the first data tag can further include information about an initial data tag carrier; the Nth data tag an further include information about the (N−1)th data tag carrier.

In the application method for tracking and utilizing data tag carriers, the first terminal and the Nth terminal are connected to a service processing manager, the method further comprising the steps of:

(A4) The service processing manager can store a first service processing information and associated information about the first terminal and the first data tag carrier;

(B4) The service processing manager can store an Nth service processing information and associated information about the Nth terminal and the Nth data tag carrier.

In the application method for tracking and utilizing data tag carriers, the data tag can be a barcode or an RFID tag.

In the application method for tracking and utilizing data tag carriers, the data tag can include electronic tags coded based on predetermined rules. In step (A3), each first data tag carrier in the first data tag carrier group can release a first data tag. The first data tag includes a first service processing information and information about the first terminal, and can release the first electronic tag in the first data tag. In step (B3), each Nth data tag carrier in the Nth data tag carrier group can release an Nth data tag. The Nth data tag includes an Nth service processing information and information about the Nth terminal, and can release the Nth electronic tag in the Nth data tag.

In the application method for tracking and utilizing data tag carriers, the first terminal and the Nth terminal both have electronic tag modules which are connected to an electronic tag server. The electronic tag server stores the first electronic tag and the Nth electronic tag. In step (A3), each first data tag carrier in the first data tag carrier group obtains the first data tag from the electronic tag server; the first data tag includes a first service processing information and information about the first terminal, and can release the first electronic tag related to the first data tag. In step (B3), each Nth data tag carrier in the Nth data tag carrier group obtains the Nth data tag from the electronic tag server; the Nth data tag includes an Nth service processing information and information about the Nth terminal, and can release the Nth electronic tag related to the Nth data tag.

In the application method for tracking and utilizing data tag carriers, the first terminal and the Nth terminal both have electronic tag modules which are connected to the network access apparatus. The network access apparatus stores the first data tag and the Nth data tag respectively associated with the first electronic tag and the Nth electronic tag. In the step (A3), each first data tag carrier in the first data tag carrier group obtains the first data tag from the network access apparatus; the first data tag includes a first service processing information and information about the first terminal, and can release the first electronic tag related to the first data tag. In step (B3), each Nth data tag carrier in the Nth data tag carrier group obtains the Nth data tag from the network access apparatus; the Nth data tag includes an Nth service processing information and information about the Nth terminal, and can release the Nth electronic tag related to the Nth data tag.

In the application method for tracking and utilizing data tag carriers, the electronic tag can be an identification mark for wireless networks SSID.

The present invention also provides a processing system for tracking and utilizing data tag carriers, which includes: the above described application system for tracking and utilizing data tag carriers, an end terminal, and the functional server. The end terminal is operated by an end user, and receives the first data tag and the Nth data tag respectively from the first data tag carrier and the Nth data tag carrier, processes the first data tag and the Nth data tag, and obtains the first and the Nth service processing information, the first and the Nth terminal information, and the first and the Nth data tag carrier information. The functional server can release the initial data tag, interacts with the end terminal, to fulfill the service functions.

In the processing system for tracking and utilizing data tag carriers, the functions server is also connected to a service processing manager. The functions server is configured to obtain the first and the Nth service processing information and associated first and the Nth carrier information from the service processing manager. The functions server is configured to determine the initial service processing information and a carrier transmission path according to the first and the Nth service processing information.

The present application also discloses to a method for tracking, utilizing, and processing data tag carriers, comprising the steps of:

(C1) The first data tag carrier or the Nth data tag carrier in the aforementioned method release the first data tag or the Nth data tag;

(C2) The end terminal acquires the first data tag or the Nth data tag based on the operation of the end user;

(C3) The end terminal analyzes the first data tag or the Nth data tag to obtain the first or the Nth service processing information, the first or the Nth terminal information, and the first or the Nth data tag carrier information;

(C4) The end (intelligent) terminal interacts with the function server according to the according to the first or the Nth service processing information to fulfill the service function.

In the method for tracking, utilizing, and processing data tag carriers, the function server can also be connected to the service processing manager, the method further comprising the steps of:

(C5) The function server obtains carrier information in the first or the Nth service processing information from the service processing manager;

(C6) The function server determines the initial service processing information and carrier transmission path according to the first or the Nth service processing information.

The above described method for tracking, utilizing, and processing data tag carriers can include the following steps prior to step (C1):

(C0) The function server generates an initial data tag comprising the initial service processing information and initial carrier information, and publishes such information on the initial carrier.

In the systems and methods for applying and processing data tag carriers, after the first terminal obtains the initial data tag, the first data tag carrier in the first data tag carrier group releases the first service processing information, information about the first terminal, the first data tag in the first data tag carrier. After the Nth terminal obtains the (N−1)th data tag, the Nth data tag carrier in the Nth data tag carrier group releases the Nth service processing information, information about the Nth terminal, and the Nth data tag in the Nth data tag carrier. The Nth terminal records the carrier information in the data tag transfer process, supports data tag transfer in offline carriers, thus significantly expanding the scope of the data tag transfers. Moreover, in the disclosed processing systems and methods, the end terminal interacts with the function server to fulfill service functions; the function server obtains the transfer paths corresponding to the initial data tag, which enables data tags to be applied on a larger scale commercial applications. Furthermore, the presently disclosed application and process methods and systems have simple system structures, are easy to implement, and have low cost.

These and other aspects, their implementations and other features are described in detail in the drawings, the description and the claims.

DETAILED DESCRIPTION OF THE INVENTION

The disclosed invention can be more clearly understood with the following detailed descriptions of the exemplified embodiments.

In some embodiments, the application system for tracking and utilizing data tag carriers includes a first terminal and a first data tag carrier group. The first terminal is configured to obtain the initial data tag from the initial data tag carrier, wherein the initial data tag includes initial service processing information and initial data tag carrier information corresponding to the initial data tag. The first data tag carrier group is coupled to the first terminal, and includes at least one first data tag carrier to obtain the initial data tag from the first terminal, and releases a first data tag through the first data tag carrier. The first data tag includes the first service processing information and the first terminal information, and releases information about the first data tag carrier for the first data tag. The terminal can be a PC, a smart phone, a tablet computer, an RFID tag scanners, or other equipment.

Figure 1:
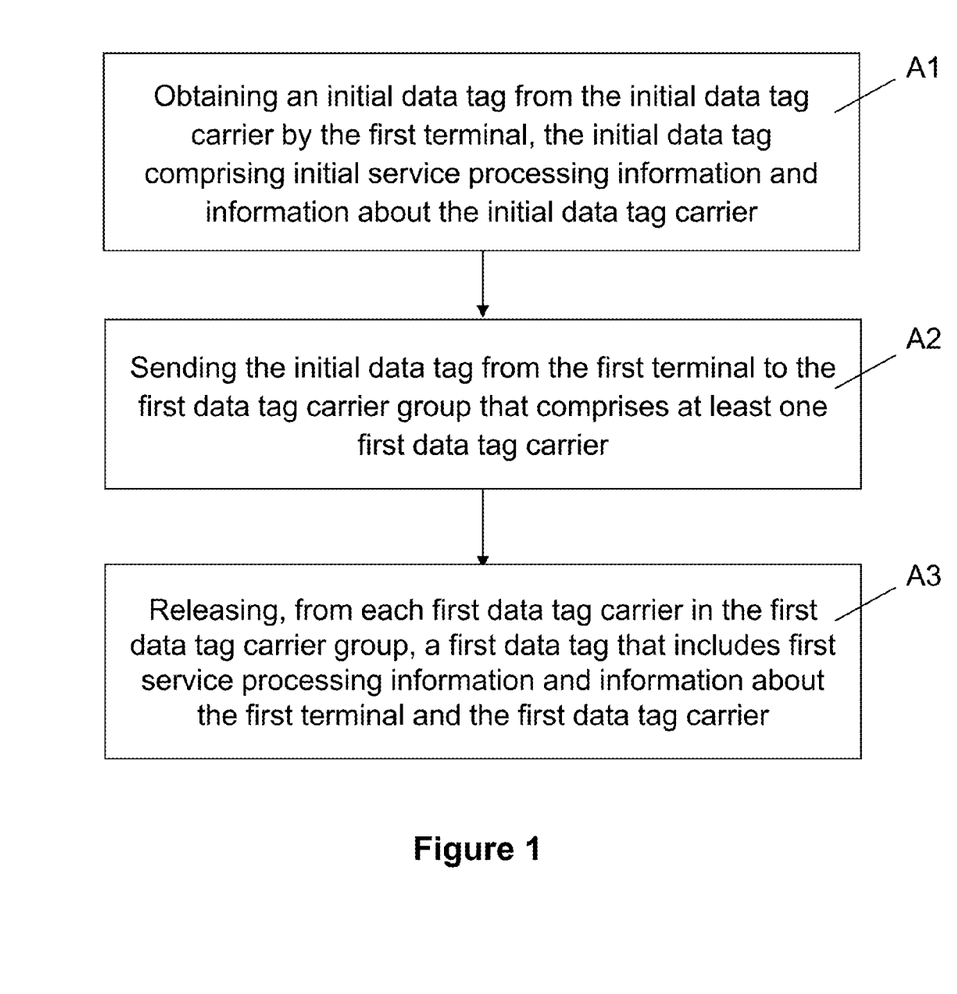
FIG. 1 is a flow diagram for an application method for tracking and utilizing data tag carriers in accordance with some embodiments of the present invention.

An application method for tracking and utilizing data tag carriers based on the above described application system, referring to FIG. 1, can include the following steps:

(A1) Based operations of the first user, the first terminal obtains the initial data tag from an initial data tag carrier, the initial data tag comprising initial service processing information, and the initial data tag carrier information;

(A2) The first terminal sends the initial data tag to the first data tag carrier group that is connected to the first terminal, the first carrier group comprising at least one first data tag carrier;

(A3) Each first data tag carrier in the first carrier group releases a first data tag, the first data tag comprising first service processing information, information about the first terminal, and can release information about the first data tag carrier related to the first data tag.

In some embodiments, the application system for tracking and utilizing data tag carriers includes an Nth terminal and an Nth data tag carrier group. The Nth terminal is configured to obtain the (N−1)th data tag from the (N−1)th data tag carrier, wherein the (N−1)th data tag includes (N−1)th service processing information and (N−1)th data tag carrier information corresponding to the (N−1)th data tag. The Nth data tag carrier group is coupled to the Nth terminal, and includes at least one Nth data tag carrier to obtain the (N−1)th data tag from the Nth terminal, and releases an Nth data tag through the Nth data tag carrier. The Nth data tag includes the Nth service processing information and the Nth terminal information, and releases information about the Nth data tag carrier for the Nth data tag.

The application method for tracking and utilizing data tag carriers based on the above described application system can include the following additional steps:

(B1) Based operations of the Nth user, the Nth terminal obtains the (N−1)th data tag from the (N−1)th data tag carrier;

(B2) The Nth terminal sends the (N−1)th data tag to the Nth data tag carrier group that is connected to the Nth terminal, the Nth carrier group comprising at least one Nth data tag carrier;

(B3) Each Nth data tag carrier in the Nth carrier group releases a Nth data tag, the Nth data tag comprising Nth service processing information, information about the Nth terminal, and can release information about the Nth data tag carrier related to the Nth data tag.

In some embodiments, the application system for tracking and utilizing data tag carriers further includes a carrier resource manager coupled to the first terminal and the Nth terminal, wherein the carrier resource manager stores the carrier group information associated with each terminal, and is configured to send the carrier group information for the end terminal to the first terminal and the Nth terminal.

In the application method for tracking and utilizing data tag carriers based on the above described application system, in the above described step (A2), the first terminal obtains information about the first data tag carrier group from the carrier resource manager, and transmits the initial data tag to at least one first data tag carrier in the first data tag carrier group. In step (B2), the Nth terminal obtains information about the Nth data tag carrier group from the carrier resource manager, and transmits the (N−1)th data tag to at least one Nth data tag carrier in the Nth data tag carrier group.

In some embodiments, the first data tag can further include information about an initial data tag carrier; the Nth data tag can further include information about the (N−1)th data tag carrier.

In some embodiments, the application system for tracking and utilizing data tag carriers further includes a service processing manager connected to the first terminal and the Nth terminal. The service processing manager can store the first and the Nth service processing information, and associated information about the first terminal, the first data tag carrier, the Nth terminal, and the Nth data tag carrier.

The application method for tracking and utilizing data tag carriers based on the above described application system can include the following additional steps:

(A4) The service processing manager can store a first service processing information and associated information about the first terminal and the first data tag carrier;

(B4) The service processing manager can store an Nth service processing information and associated information about the Nth terminal and the Nth data tag carrier.

In some embodiments, the data tag can be a barcode or an RFID tag. The carrier can be a display device, prints, and the surface of a building or furniture.

In some embodiments, the data tag can include electronic tags coded based on predetermined rules. The first data tag includes a first service processing information and information about the first terminal, and can release the first electronic tag in the first data tag. The Nth data tag includes an Nth service processing information and information about the Nth terminal, and can release the Nth electronic tag in the Nth data tag.

In the application method for tracking and utilizing data tag carriers based on the above described application system, in step (A3), each first data tag carrier in the first data tag carrier group can release a first data tag. The first data tag includes a first service processing information and information about the first terminal, and can release the first electronic tag in the first data tag. In step (B3), each Nth data tag carrier in the Nth data tag carrier group can release an Nth data tag. The Nth data tag includes an Nth service processing information and information about the Nth terminal, and can release the Nth electronic tag in the Nth data tag.

The electronic tag can be realized by an electronic tag server, and by connecting to a network access apparatus (such as a router, a base station, etc.).

In implementations using an electronic tag server, the first terminal and the Nth terminal both have electronic tag modules which respectively obtain the first electronic tag and the Nth electronic tag from the computer network. The system can include an electronic tag server connected to the first terminal and the Nth terminal through a computer network. The electronic tag server stores the first electronic tag and the Nth electronic tag, and can send to the first terminal the first data tag associated with the first electronic tag, and to the Nth terminal the Nth data tag associated with the Nth electronic tag.

Accordingly, in step (A3), each first data tag carrier in the first data tag carrier group obtains the first data tag from the electronic tag server; the first data tag includes a first service processing information and information about the first terminal, and can release the first electronic tag related to the first data tag. In step (B3), each Nth data tag carrier in the Nth data tag carrier group obtains the Nth data tag from the electronic tag server; the Nth data tag includes an Nth service processing information and information about the Nth terminal, and can release the Nth electronic tag related to the Nth data tag.

In implementations using an network access apparatus, the first terminal and the Nth terminal both have electronic tag modules, which respectively obtain the first electronic tag and the Nth electronic tag from the computer network. The system can include a network access apparatus connected to the first terminal and the Nth terminal through a computer network. The network access apparatus stores the first data tag and the Nth data tag respectively associated with the first electronic tag and the Nth electronic tag, which allow it to send the first data tag associated with the first electronic tag to the first terminal and to send the Nth data tag associated with the Nth electronic tag to the Nth terminal.

Accordingly, in the step (A3), each first data tag carrier in the first data tag carrier group obtains the first data tag from the network access apparatus; the first data tag includes a first service processing information and information about the first terminal, and can release the first electronic tag related to the first data tag. In step (B3), each Nth data tag carrier in the Nth data tag carrier group obtains the Nth data tag from the network access apparatus; the Nth data tag includes an Nth service processing information and information about the Nth terminal, and can release the Nth electronic tag related to the Nth data tag.

The electronic tag can be an identification mark for wireless networks SSID.

The present invention also provides a processing system for tracking and utilizing data tag carriers. In some embodiments, the above described application system for tracking and utilizing data tag carriers, an end terminal, and the functional server. The end terminal is operated by an end user, and receives the first data tag and the Nth data tag respectively from the first data tag carrier and the Nth data tag carrier, and processes the first data tag and the Nth data tag to obtain the first and the Nth service processing information, the first and the Nth terminal information, and the first and the Nth data tag carrier information. The functional server can release the initial data tag, and determines transmission path based on the first and the Nth service processing information.

An application method for tracking and utilizing data tag carriers based on the above described application system can include the following steps:

(C0) The function server generates an initial data tag comprising the initial service processing information and initial carrier information, and publishes such information on the initial carrier;

(C1) The first data tag carrier or the Nth data tag carrier in the aforementioned method release the first data tag or the Nth data tag;

(C2) The end terminal acquires the first data tag or the Nth data tag based on the operation of the end user;

(C3) The end terminal analyzes the first data tag or the Nth data tag to obtain the first or the Nth service processing information, the first or the Nth terminal information, and the first or the Nth data tag carrier information;

(C4) The end (intelligent) terminal interacts with the function server according to the according to the first or the Nth service processing information to fulfill the service function.

In some embodiments, in the method for tracking, utilizing, and processing data tag carriers, the function server can also be connected to the service processing manager. The service processing manager is configured to obtain the first and the Nth service processing information from the service processing manager, and determines the initial service processing information and a transmission path according to the first and the Nth service processing information.

The application method for tracking and utilizing data tag carriers based on the above described application system can further include the step of:

(C5) The function server obtains carrier information in the first or the Nth service processing information from the service processing manager;

(C6) The function server determines the initial service processing information and carrier transmission path according to the first or the Nth service processing information.

The systems and methods for applying and processing data tag carriers are illustrated in the following examples.

EXAMPLE 1

Figure 2:
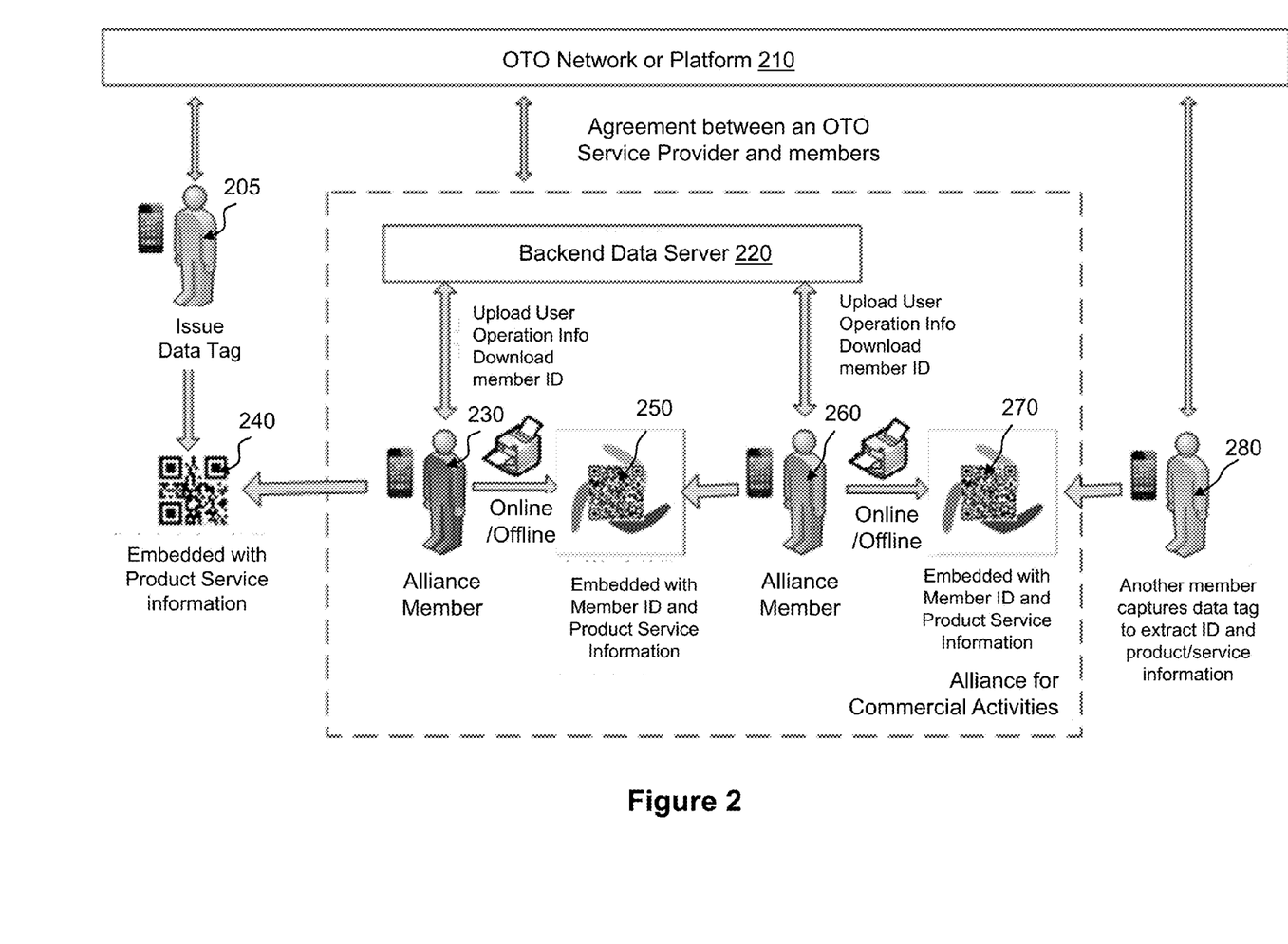
FIG. 2 is a schematic diagram for a processing system for tracking and utilizing data tag carriers in accordance with some embodiments of the present invention.

As shown in FIG. 2, publishers have advertising spaces on newspapers and magazine and hope businesses to advertise in these spaces. On the other hand, product and service providers also want to advertise in publications. In the present disclosure, the publishers, the product service providers, and users can join in agreement with an OTO service provider to become members of an alliance. A publisher 230 (i.e. the first user) can use their smart terminal (i.e. the first terminal) to take a picture of a two-dimensional code 240 (i.e. the initial data tag) issued by a product and service provider 205 over a service provider network (e.g. an OTO network or platform 210 etc.). The two-dimensional code is then sent to a backend data server 220 (i.e. the carrier resource manager). The backend data server 220 stores information about the advertising spaces in the publication (information about an initial data tag carrier), and generates a new two-dimensional code 250 (i.e. the first data tag) using the original two-dimensional code 240 (i.e. the initial data tag) and the information about the advertising spaces in the publication (information about the initial data tag carrier). The backend data server 220 sends the new two-dimensional code (i.e. the first data tag) back to the publisher 230, while the backend data server 220 records information about the data tag carrier corresponding to the original two-dimensional code. The publisher 230 may print the two-dimensional code 250 (a second data tag) on its publication's advertising space for a reader to obtain the appropriate product or service information. Similarly, another alliance member 260 can take a picture of the two-dimensional code 250 offline, upload it to the backend data server 220 and generate another two-dimensional code 270 to provide additional products and services to other users 280.

EXAMPLE 2

On the basis of Example 1, another outdoor advertising company (the second user 280 has a plurality of outdoor advertisements (the second carrier). The outdoor advertising company 280 can use their smart terminal 285 (the second terminal) to take a picture of a two-dimensional code 270 (the first data tag) printed on a publication. The two-dimensional code 270 (the first data tag) is sent to the backend data server 220 (the carrier resource manager). The backend data server 220 stores the outdoor advertising company's advertising message (information about the second data tag carrier). The backend data server 220 uses the information about the second data tag carrier to replace the first data tag carrier in the first data tag to generate a new two-dimensional code 320 (the second data tag), and returns to the outdoor advertising company 280. The backend data server 220 records with the original dimensional code 270 and the corresponding second carrier information. The outdoor advertising company can print two-dimensional code 320 (second data tag) in an outdoor advertisement for users 320 to obtain the appropriate product or service information. Thus data tag information is effectively transferred offline.

EXAMPLE 3

Based on the above Examples 1 and 2, referring to FIG. 2, a user 320 (end-users) sees the outdoor advertisement and hopes to obtain the advertised product or service. The user 320 can take advantage of an intelligent terminal 325 (the end terminal) to capture an image of the two-dimensional code 310 (the first or second data tag) printed in the outdoor advertisement. The two-dimensional code 310 is decoded and the user 320 obtains the corresponding products and services by interacting with the service provider network (e.g. an OTO network or platform 210 etc.). At this point, the service provider network (e.g. an OTO network or platform 210 etc.) obtains the transmission path for all the cascaded data tags through the backend data server 220, and determines commercial contributions and revenue shares by each of the online and offline carriers based on the transfer path.

EXAMPLE 4

Figure 3:
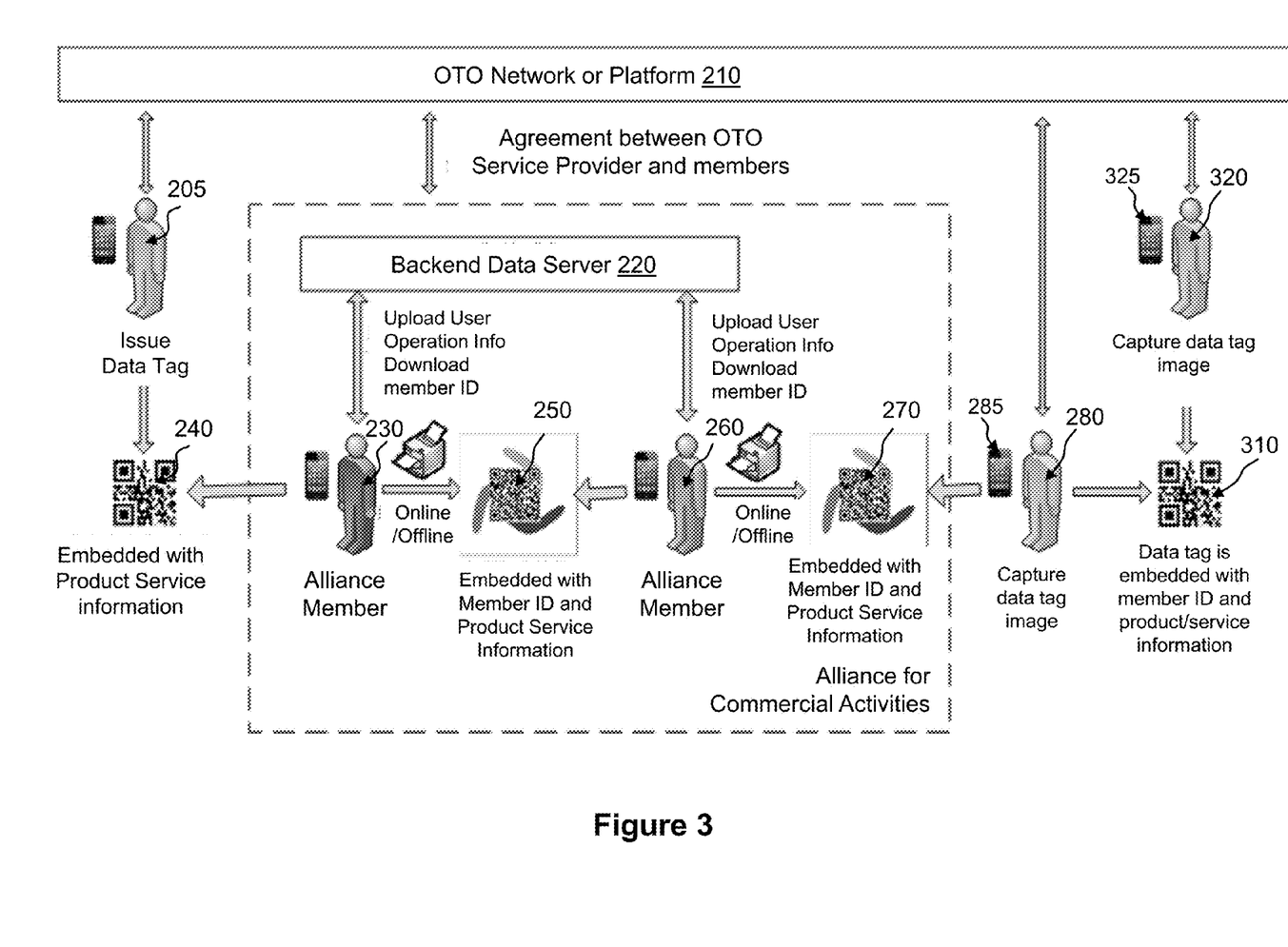
FIG. 3 is a schematic diagram for another processing system for tracking and utilizing data tag carriers in accordance with some embodiments of the present invention.

On the basis of the embodiment 3, shown in FIG. 3, the end user can also be an intermediate user, who while receiving a product or service, can forward the two-dimensional code (the data tag) to the next user, thus further expanding the application of the data tags.

Figure 4:
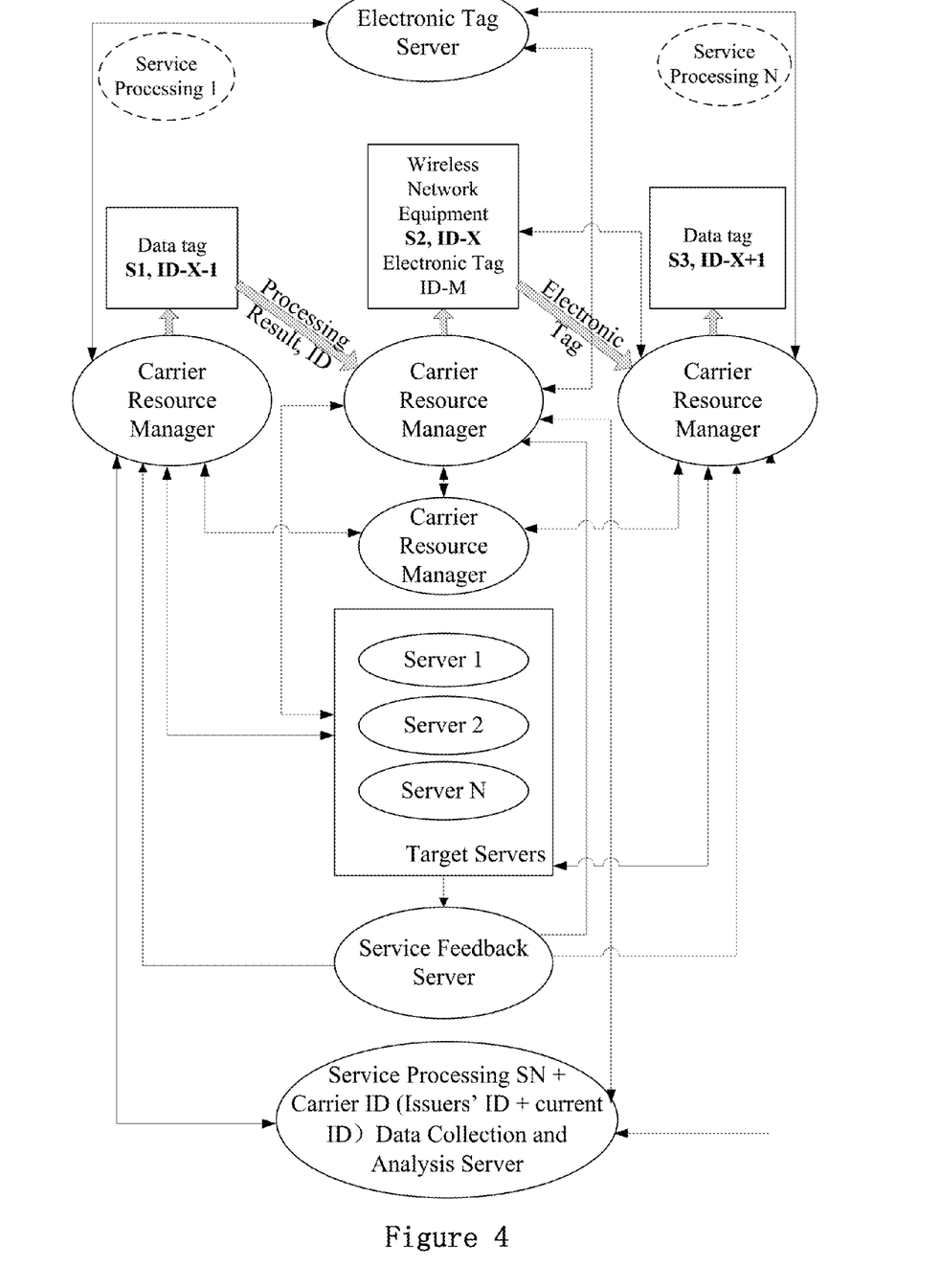
FIG. 4 illustrates an application method for tracking and utilizing data tag carriers in an exemplified application involving an electronic based on the data tag.

In particular, the presently disclosed methods allow electronic tags to be used as the data tags, as shown in FIG. 4.

When the end terminal is a smart terminal or a computer, the disclosed method can include one or more of the following steps:

1. The intelligent terminal or computer running at each node is installed with a dedicated App or software. The App or software stores a wireless network device identifier (e.g. SSID) and the corresponding security token. The App or software allows the intelligent terminal or computer to be automatically connected to a wireless network.

2. ID-X obtains a data tag (containing: the service processing information S1 and carrier ID-X−1) in the carrier ID-X−1 and generates service processing information S2 based on operations on ID-X.

3. ID-X release wireless network equipment identity (such as: SSID) based on the definition of encoding rules of the electronic tags, and generates the next level electronic tag ID-M.

4. Using the dedicated App or software, ID-X generates service processing information S2. ID-X transfers S2 and information about ID-X carrier and the electronic tag ID-M to an electronic tag server that is responsible for registration and analysis of the electronic tags. A new virtual data tag is generated and stored on the electronic tag server.

5. The intelligent terminal or computer ID-X+1 uses its dedicated App or software to connect to a wireless network to obtain a wireless network connected device identification, and obtains electronic tag ID-M.

6. ID-X+1 receives electronic tag ID-M from the electronic tag server for resolution, receives from ID-X/ID-M the virtual data tag (containing: service processing S2 and information for carrier ID-X/ID-M).

When the terminals are the wireless network devices, the method can include the following steps:

1. The intelligent terminal or computer running at each node is installed with a dedicated App or software. The App or software stores a wireless network device identifier (e.g. SSID) and the corresponding security token. The App or software allows the intelligent terminal or computer to be automatically connected to a wireless network.

2. Each wireless network device stores an electronic tag ID-M defined by electronic tag encoding rules, and can store virtual data tag. The storage space is accessible to the dedicated App or software for read and write.

3. ID-X obtains a data tag (containing: the service processing information S1 and carrier ID-X−1) in the carrier ID-X−1 and generates service processing information S2 based on operations on ID-X.

4. Using the dedicated App or software, ID-X generates service processing information S2. ID-X transfers S2 and information about ID-X carrier and the electronic tag ID-M to an electronic tag server that is responsible for registration and analysis of the electronic tags. A new virtual data tag is generated and stored on the electronic tag server.

5. The intelligent terminal or computer ID-X+1 uses its dedicated App or software to connect to a wireless network to obtain data (the service processing information S2 and the carrier information ID-X) currently stored in the wireless equipment.

6. ID-X+1 receives electronic tag ID-M from the electronic tag server for resolution, receives from ID-X/ID-M the virtual data tag (containing: service processing S2 and information for carrier ID-X/ID-M).

In summary, the presently disclosed systems and methods not only provide effective offline data tag transfer, but also include the following advantages:

1. The disclosed systems and methods are cross organizations and cross platforms, and can effectively utilize platform resources to build vastly dynamic, large-scale, multi-format commercial activities and a service ecosystem. The mode of operation can be easily scaled based on predefined agreements.

2. The forwarding of data tags can bridge the gap in offline business activities in the existing OTO or Internet technologies.

3. The disclosed systems and methods allow online and offline resources to participate commercial activities and share benefits.

4. Finally, the participation of the online and offline resources can support comprehensive data collection and analysis, which generates additional benefits for the participants.

In the presently disclosed system and methods for applying and processing data tag carriers, after the first terminal obtains the initial data tag, the first data tag carrier in the first data tag carrier group releases the first service processing information, information about the first terminal, the first data tag in the first data tag carrier. After the Nth terminal obtains the (N−1)th data tag, the Nth data tag carrier in the Nth data tag carrier group releases the Nth service processing information, information about the Nth terminal, and the Nth data tag in the Nth data tag carrier. The Nth terminal records the carrier information in the data tag transfer process, supports data tag transfer in offline carriers, thus significantly expanding the scope of the data tag transfers. Moreover, in the disclosed processing systems and methods, the end terminal interacts with the function server to fulfill service functions; the function server obtains the transfer paths corresponding to the initial data tag, which enables data tags to be applied on a larger scale commercial applications. Furthermore, the presently disclosed application and process methods and systems have simple system structures, are easy to implement, and have low cost.

In the present specification, the present invention has been described with specific examples. However, it should be noted that various modifications and variations may be made without departing from the spirit and scope of the invention. Accordingly, the specification and drawings are to be regarded for illustrative rather than restrictive purposes.

What is claimed is:

1. An application system for tracking and utilizing data tag carriers, comprising:
    a first terminal configured to obtain an initial data tag from an initial data tag carrier, wherein the initial data tag includes initial service processing information and information about the initial data tag carrier;
    a first data tag carrier group coupled to the first terminal and comprising at least one first data tag carrier, wherein the first data tag carrier group is configured to obtain the initial data tag from the first terminal and to release the first data tag through the first data tag carrier, wherein the first data tag comprises a first service processing information, information about the first terminal and the first data tag carrier;
    a Nth terminal configured to obtain an (N−1)th data tag from an (N−1)th data tag carrier, wherein the (N−1)th data tag includes (N−1)th service processing information and information about the initial data tag carrier, wherein N is an integer bigger than 1; and
    a Nth data tag carrier group coupled to the Nth terminal and comprising at least one Nth data tag carrier, wherein the Nth data tag carrier group is configured to obtain the (N−1)th data tag from the Nth terminal and to release the Nth data tag through the Nth data tag carrier, wherein the Nth data tag comprises an Nth service processing information, information about the Nth terminal and the Nth data tag carrier.

2. The application system for tracking and utilizing data tag carriers of claim 1, further comprising:
    a carrier resource manager connected to the first terminal and the Nth terminal, wherein the carrier resource manager is configured to store information about data tag carriers associated with from first terminal to the Nth terminal, and to send the information about the Nth terminal and the Nth data tag carrier to the first terminal and the Nth terminal.

3. The application system for tracking and utilizing data tag carriers of claim 1, wherein the first data tag further comprises information about an initial data tag carrier, wherein the Nth data tag further comprises information about an (N−1)th data tag carrier.

4. The application system for tracking and utilizing data tag carriers of claim 1, further comprising:
a service processing manager connected to the first terminal and the Nth terminal, wherein the service processing manager is configured to store the first service processing information and the Nth service processing information and associated information about the first terminal, the first data tag carrier, the Nth terminal, and the Nth data tag carrier.

5. The application system for tracking and utilizing data tag carriers of claim 1, wherein the data tag includes a barcode or an RFID tag.

6. The application system for tracking and utilizing data tag carriers of claim 1, wherein the data tag carrier includes a display device, prints, or a surface of a building or furniture.

7. The application system for tracking and utilizing data tag carriers of claim 1, wherein the first data tag includes a first service processing information and information about the first terminal, and is configured to release a first electronic tag in the first data tag, wherein the Nth data tag includes an Nth service processing information and information about the Nth terminal, and is configured to release an Nth electronic tag in the Nth data tag.

8. The application system for tracking and utilizing data tag carriers of claim 7, wherein the first terminal and the N terminal each includes an electronic tag modules that is configured to respectively obtain the first electronic tag and the Nth electronic tag through a computer network.

9. The application system for tracking and utilizing data tag carriers of claim 8, further comprising:
an electronic tag server connected to the first terminal and the second terminal through the computer network, wherein the electronic tag server is configured to store the first electronic tag and the Nth electronic tag, and is configured to provide the first electronic tag to the first terminal and to provide Nth electronic tag to the N terminal.

10. The application system for tracking and utilizing data tag carriers of claim 8, further comprising:
a network access device connected to the first terminal and the second terminal through the computer network, wherein the network access device is configured to store the first data tag and the Nth data tag respectively associated with the first electronic tag and the Nth electronic tag, wherein the network access device is configured to store the first electronic tag and the Nth electronic tag, and is configured to provide the first electronic tag to the first terminal and to provide Nth electronic tag to the N terminal.

11. The application system for tracking and utilizing data tag carriers of claim 7, wherein the electronic tag is an identification mark for the wireless network (SSID).

12. The application system for data tag carriers of claim 1, wherein the first terminal includes a personal computer, a smart phone, a tablet computer, or an RFID tag scanner.

13. A application method for tracking and utilizing data tag carriers, comprising the steps of:

(A1) obtaining an initial data tag from an initial data tag carrier by a first terminal in response to operations of a first user, wherein the initial data tag comprises initial service processing information and information about the initial data tag carrier;

(A2) sending the initial data tag from the first terminal to a first data tag carrier group that is connected to the first terminal, the first carrier group comprising at least one first data tag carrier;

(A3) releasing a first data tag by each first data tag carrier in the first carrier group, the first data tag comprising first service processing information, information about the first terminal, and information about the first data tag carrier related to the first data tag;

(B1) obtaining an (N−1)th data tag from an (N−1)th data tag carrier by a Nth terminal in response to operations of a Nth user, wherein the (N−1)th data tag includes (N−1)th service processing information and information about the (N−1)th data tag carrier, wherein N is an integer bigger than 1;

(B2) sending the N−1)th data tag from the Nth terminal to a Nth data tag carrier group that is connected to the Nth terminal, the Nth carrier group comprising at least one Nth data tag carrier; and (B3) releasing an Nth data tag by each Nth data tag carrier in the Nth carrier group, the Nth data tag comprising Nth service processing information, information about the Nth terminal, and information about the Nth data tag carrier related to the Nth data tag.

14. The application method for tracking and utilizing data tag carriers of claim 13, wherein the first terminal and the Nth terminal are connected to the carrier resource manager, wherein the carrier resource manager is configured to store information about data tag carriers associated with from first terminal to the Nth terminal,
wherein the step (A2) comprises:
obtaining information about the first data tag carrier group from the carrier resource manager by the first terminal, and
transmitting the initial data tag to at least one first data tag carrier in the first data tag carrier group,
wherein the step (B2) comprises:
obtaining information about the Nth data tag carrier group from the carrier resource manager by the Nth terminal; and
transmitting the (N−1)th data tag to at least one Nth data tag carrier in the Nth data tag carrier group.

15. The application method for tracking and utilizing data tag carriers of claim 13, wherein the first data tag further comprises information about an initial first data tag carrier, wherein the Nth data tag further comprises information about a (N−1)th data tag carrier.

16. The application method for tracking and utilizing data tag carriers of claim 13, wherein the first terminal and the Nth terminal are connected to the service processing manager, the method further comprising:
(A4) storing a first service processing information and associated information about the first terminal and the first data tag carrier in the service processing manager; and
(B4) storing an Nth service processing information and associated information about the Nth terminal and the Nth data tag carrier in the service processing manager.

17. The application method for tracking and utilizing data tag carriers of claim 13, wherein the data tag includes a barcode tag or an RFID tag.

18. The application method for tracking and utilizing data tag carriers of claim 13, wherein the step (A3) comprise:
    releasing a first data tag by each first data tag carrier in the first data tag carrier group, the first data tag comprising a first service processing information and information about the first terminal, and a first electronic tag;
    wherein the step (B3) comprise:
    releasing an Nth data tag by each Nth data tag carrier in the Nth data tag carrier group, the Nth data tag comprising an Nth service processing information and information about the Nth terminal, and an Nth electronic tag.

19. The application method for tracking and utilizing data tag carriers of claim 18, wherein the first terminal and the Nth terminal are connected to an electronic tag server through the computer network,
    wherein the electronic tag server is configured to store the first electronic tag and the Nth electronic tag, wherein the step (A3) comprise:
        obtaining the first data tag from the electronic tag server by each first data tag carrier in the first data tag carrier group, the first data tag comprising a first service processing information, information about the first terminal, and the first electronic tag;
    wherein the step (B3) comprise:
        each Nth data tag carrier in the Nth data tag carrier group obtains the Nth data tag from the electronic tag server, the Nth data tag comprising an Nth service processing information, information about the Nth terminal, and the Nth electronic tag.

20. The application method for tracking and utilizing data tag carriers of claim 18, wherein the first terminal and the Nth terminal are connected to a network access device through the computer network,
    wherein the network access device is configured to store the first data tag and the Nth data tag respectively associated with the first electronic tag and the Nth electronic tag, wherein the step (A3) comprise:
        obtaining the first data tag from the network access device by each first data tag carrier in the first data tag carrier group, the first data tag comprising a first service processing information, information about the first terminal, and the first electronic tag;
    wherein the step (B3) comprise:
        each Nth data tag carrier in the Nth data tag carrier group obtains the Nth data tag from the network access device, the Nth data tag comprising an Nth service processing information, information about the Nth terminal, and the Nth electronic tag.

21. The application method for tracking and utilizing data tag carriers of claim 20, wherein the electronic tag is identification mark for the wireless network SSID.

22. A processing system for tracking and utilizing data tag carriers, comprising:
    a first terminal configured to obtain an initial data tag from an initial data tag carrier, wherein the initial data tag includes initial service processing information and information about the initial data tag carrier;
    a first data tag carrier group coupled to the first terminal and comprising at least one first data tag carrier, wherein the first data tag carrier group is configured to obtain the initial data tag from the first terminal and to release the first data tag through the first data tag carrier, wherein the first data tag comprises a first service processing information, information about the first terminal and the first data tag carrier;
    a Nth terminal configured to obtain an (N–1)th data tag from an (N–1)th data tag carrier, wherein the (N–1)th data tag includes (N–1)th service processing information and information about the initial data tag carrier, wherein N is an integer bigger than 1; and
    a Nth data tag carrier group coupled to the Nth terminal and comprising at least one Nth data tag carrier, wherein the Nth data tag carrier group is configured to obtain the (N–1)th data tag from the Nth terminal and to release the Nth data tag through the Nth data tag carrier, wherein the Nth data tag comprises a Nth service processing information, information about the Nth terminal and the Nth data tag carrier;
    an end terminal operated by an end user, configured to obtain the first data tag from the first data tag carrier or the Nth data tag from the Nth data tag carrier, to analyze the first data tag and the Nth data tag to obtain the first service processing information and the Nth service processing information, and information about the first terminal, the first data tag carrier and the Nth data tag carrier; and
    a functional server configured to generate a service function and to release the initial data according to the service function, and to interact with the end terminal to fulfill the service function.

23. The processing system for tracking and utilizing data tag carriers of claim 22, further comprising:
    a service processing manager connected to the functions server;
    wherein the functions server is configured to obtain from the service processing manager, the first service processing information, the Nth service processing information, and information about the first data tag carrier and the Nth data tag carrier, wherein the functions server is configured to determine initial service processing information and a carrier transmission path based on the first service processing information and the Nth service processing information.

* * * * *